(12) United States Patent
Nyssen et al.

(10) Patent No.: US 6,596,073 B1
(45) Date of Patent: Jul. 22, 2003

(54) SOLID PIGMENT PREPARATIONS

(75) Inventors: Peter Roger Nyssen, Dormagen (DE); Josef Witt, Leverkusen (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 09/890,886

(22) PCT Filed: Feb. 27, 2000

(86) PCT No.: PCT/EP00/00605

§ 371 (c)(1),
(2), (4) Date: Aug. 6, 2001

(87) PCT Pub. No.: WO00/47681

PCT Pub. Date: Aug. 17, 2000

(30) Foreign Application Priority Data

Feb. 9, 1999 (DE) .......................................... 199 05 269

(51) Int. Cl.$^7$ .............................................. C09B 67/20
(52) U.S. Cl. ...................... 106/499; 106/402; 106/420; 106/429; 106/440; 106/441; 106/447; 106/453; 106/460; 106/465; 106/471; 106/476; 106/479; 106/487; 106/491; 106/493; 106/494; 106/495; 106/496; 106/497; 106/498; 106/501.1; 106/503
(58) Field of Search ................................. 106/493, 494, 106/495, 496, 497, 498, 499, 501.1, 503, 402, 420, 429, 447, 453, 460, 476, 440, 441, 465, 471, 479, 487, 491

(56) References Cited

U.S. PATENT DOCUMENTS

| | | | |
|---|---|---|---|
| 3,652,313 A | 3/1972 | Nagata et al. ............ | 106/193 J |
| 4,056,402 A | 11/1977 | Guzi, Jr. ................. | 106/308 Q |
| 4,369,070 A | 1/1983 | Aign et al. ............. | 106/308 N |
| 4,839,461 A | 6/1989 | Boehmke ................. | 528/363 |
| 4,997,870 A | 3/1991 | Schilling et al. ............ | 524/423 |
| 5,681,876 A | 10/1997 | Schneider et al. .......... | 523/351 |
| 5,855,662 A | 1/1999 | Brand et al. ................. | 106/498 |
| 5,888,400 A | 3/1999 | Tholema et al. ............ | 210/644 |
| 6,077,339 A | 6/2000 | Nyssen et al. ........... | 106/31.77 |
| 6,245,138 B1 | 6/2001 | Nyssen et al. ........... | 106/31.86 |
| 6,478,866 B1 * | 11/2002 | Nyssen et al. .............. | 106/503 |

FOREIGN PATENT DOCUMENTS

| | | |
|---|---|---|
| EP | 0 735 109 | 10/1996 |
| EP | 0 751 189 | 1/1997 |
| GB | 473058 | 9/1937 |
| GB | 691260 | 5/1953 |
| GB | 1249912 | 10/1971 |
| GB | 1434292 | 5/1976 |
| GB | 1537223 | 12/1978 |
| GB | 2001352 | 1/1979 |

OTHER PUBLICATIONS

*Database WPI, Section Ch, Week 197638, Derwent Publications Ltd., London, GB; AN 1976–71102X, XP002137002 & JP 51 088523 A (Sakakibara M.) Aug. 3, 1976.

* cited by examiner

Primary Examiner—Anthony J. Green
(74) Attorney, Agent, or Firm—Godfried R. Akorli; Diderico van Eyl

(57) ABSTRACT

The invention relates to a solid pigment composition comprising
  a) at least one pigment,
  b) at least one compound selected from the group consisting of
    b0) a phenol-styrene-polyglycol ether or an ionically modified phenol-styrene-polyglycol ether,
    b1) a condensation product prepared from
      b1A) sulphonated aromatics
      b1B) aldehydes and/or ketones and
      b1C) optionally one or more compounds selected from the group of unsulphonated aromatics, urea and urea derivatives, and
    b2) phosphoric acid, phosphonic acid and derivatives thereof, and
  c) at least one organic thickener.

23 Claims, No Drawings

SOLID PIGMENT PREPARATIONS

The invention relates to solid pigment preparations, to processes for preparing them and to their use for pigmenting natural and synthetic materials, especially for pigmenting and colouring building materials such as concrete, plasters, mortar, asphalt, for example, aqueous coating compositions, varnishes and emulsion paints, aqueous coating compositions for fabric and paper, paper in the pulp, and polymers, e.g. synthetic or semisynthetic fibre materials.

For pigmenting in the abovementioned applications it is nowadays customary to use aqueous or aqueous/organic pigment preparations. Such preparations are disclosed, for example, in DE-A 195 11 624. In the course of preparing the preparations, dispersants or emulsifiers are used which stabilize the pigment particles physically in their finely divided form in an aqueous or aqueous/organic medium. Also critical to the selection of the dispersants is their compatibility in the various application media. For example, the preparations should be easy to incorporate into the application medium without flocculation or reaggregation of the pigment particles.

Customarily, anionic, cationic, nonionic or amphoteric dispersants, in polymeric form as well where appropriate, are employed.

In many cases, aqueous pigment preparations contain so-called dryout preventatives or agents for enhancing the freeze resistance, in the form for example of volatile organic solvents such as glycols or nonvolatile polyetherpolyols (polyglycols), for example.

These additives are of particular importance for the storage of such liquid preparations, but not for the application per se.

Whereas volatile organic solvent additives possess ecological disadvantages in the application, polymeric nonvolatile additives often have the disadvantages that, for example, they impair the rheology of the preparations or they greatly complicate the microbiological preservation of the preparations, or else that they remain in the application medium and impair, for example, the drying properties (e.g. in emulsion paints).

There is therefore a need for new pigment preparations which are comparable with or superior to liquid preparations in terms of their application properties and which do not possess the disadvantages described. There is also a need for pigment preparations which may be used universally in different aqueous application systems, i.e. which are highly compatible with a large number of binders.

DE 19 523 204 describes pulverulent pigment formulations comprising not only organic or inorganic pigment but also specific dispersants from the group of the novolaks or alkoxylated fatty acid derivatives and, as further component, a water-soluble mixture of polyvinyl alcohol and vinyl alcohol or vinyl alcohol copolymers, and which can be used to pigment plasters and architectural coating dispersions. In particular, the solid products of DE-A 195 23 204 further require the addition of so-called dedusters in order to be able to be referred to as low-dust products.

DE 3 839 865 describes polyvinyl alcohols adsorbed on pigments, which may be used as binders in paper coating slips and paper coatings and which are notable for improved low-temperature solubility of the polyvinyl alcohols.

In both cases, the application possibilities of the products obtained are limited.

Both references describe products whose particle sizes are dependent on the particle size of the pigment suspension used; as a result, in the case of very finely divided colour pigments having average particle diameters of <1 μm, low-dust products are already unlikely per se.

The pigment formulations specified in DE 19 523 204 are also in need of improvement with regard to universal usefulness, such as compatibility with a modern aqueous binder system (ready miscibility, flocculation stability, colour acceptance, high colour yield, and colour stability over time after tinting) in, for example, white emulsion paints based on silicone, PU, alkyd or acrylic dispersion binders, especially those with a pigment volume concentration (PVC) above the critical pigment volume concentration (CPVC).

It is an object of the present invention, therefore, to provide solid pigment preparations which do not possess the abovementioned disadvantages.

The invention accordingly provides solid pigment preparations comprising
  a) at least one pigment,
  b) at least one optionally ionically modified phenol-styrene-polyglycol ether and
  c) at least one organic thickener.

By pigments are meant preferably particulate solids having an average primary particle size of from 0.01 to 100 μm, preferably from 0.01 to 10 μm. In the context of this specification, pigments also preferably include those particulate solids having a solubility in water at 20° C. of <100 mg/l; in particular, they are insoluble in water or aqueous-organic media.

The pigments that are present in the preparations of the invention are not subject to any restriction.

Suitable inorganic pigments are, for example, oxide pigments such as iron oxides, titanium dioxides, chromium oxides, zinc oxides, manganese iron oxides, nickel and chromium titanium dioxides, rutile mixed-phase pigments. Further inorganic pigments are zinc sulphides, ultramarine, sulphides of the rare earths, and bismuth vanadate.

Suitable inorganic fillers which are likewise understood as pigments in the context of this invention are, for example, inorganic compounds with a low colouring power, such as natural iron oxides, zinc sulphide, aluminium oxide, heavy spar, siliceous earth, silicates (mica, clay, talc), calcium carbonate and calcium sulphate.

Furthermore, depending on the field of use, the inorganic pigments may also have been organically or inorganically aftertreated.

Suitable organic pigments are, for example, those of the monoazo, disazo, laked azo, β-naphthol, Naphtol AS, benzimidazolone, disazo condensation, azo metal complex, isoindolinone and isoindoline series, and also polycyclic pigments of, for example, the phthalocyanine, quinacridone, perylene, perinone, thioindigo, anthraquinone, dioxazine, quinophthalone and diketopyrrolopyrrole series.

Also included are laked dyes such as Ca, Mg and Al lakes of dyes containing sulphonic acid groups and/or carboxylic acid groups, and also carbon blacks, which for the purposes of this specification are taken to be pigments and of which a large number are known, for example, from the Colour Index, 2nd edition.

As carbon blacks, mention may be made, for example, of the following: acidic to alkaline blacks from the gas black or furnace black process, and also chemically surface-modified blacks, examples being sulpho- or carboxyl-containing blacks.

Also suitable are mixed crystallizations (solid solutions) of the abovementioned organic pigments, mixtures of organic and/or inorganic pigments, metal pigments coated with inorganic pigments or carbon black, mica pigments or talc pigments, e.g. mica coated with iron oxide by CVD processes, and also mixtures of the abovementioned pigments with one another.

Optionally ionically modified phenol-styrene polyglycol ethers of component b) are known, for example, from DE-A-19 644 077.

Preferred compounds of component b) have an HLB of from 10 to 20, in particular from 12 to 18.

Preferred alkoxylation products of styrene-phenol condensates are those of the formula (X)

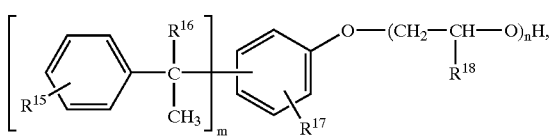

(X)

in which
$R^{15}$ denotes hydrogen or $C_1$–$C_4$-alkyl,
$R^{16}$ represents hydrogen or $CH_3$,
$R^{17}$ denotes hydrogen, $C_1$–$C_4$-alkyl, $C_1$–$C_4$-alkoxy, $C_1$–$C_4$-alkoxycarbonyl or phenyl,
m denotes a number from 1 to 4,
n denotes a number from 6 to 120,
$R^{18}$ is identical or different for each unit indicated by n and represents hydrogen, $CH_3$ or phenyl, and, where $CH_3$ is present in the various —($-CH_2$—$CH(R^{18})$—O—)— groups, $R^{18}$ represents $CH_3$ in from 0 to 60% of the total value of n and $R^{18}$ represents hydrogen in from 100 to 40% of the total value of n, and, where phenyl is present in the various —($-CH_2$—$CH(R^{18})$—O—)— groups, $R^{18}$ represents phenyl in from 0 to 40% of the total value of n and $R^{18}$ represents hydrogen in from 100 to 60% of the total value of n.

Preferred ionically modified alkoxylation products (X) are those of the formula (XI)

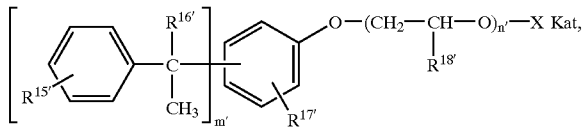

(XI)

in which
$R^{15'}$, $R^{16'}$, $R^{17'}$, $R^{18'}$, m' and n' adopt the scope of definition of $R^{15}$, $R^{16}$, $R^{17}$, $R^{18}$, m and n, respectively, but independently thereof,
X denotes the group $-SO_3^\ominus$, $-SO_2^\ominus$, $PO_3^{\ominus\ominus}$ or —CO—($R^{19}$)—COO$^\ominus$,
Kat is a cation from the group of $H^\oplus$, $Li^\oplus$, $Na^\oplus$, $K^\oplus$, $NH_4^\oplus$ or —HO—$CH_2CH_2$—$NH_4^\oplus$, and where X=—$PO_3^{\ominus\ominus}$ Kat is present twice, and
$R^{19}$ represents a divalent aliphatic or aromatic radical, preferably $C_1$–$C_4$-alkylene, especially ethylene, monounsaturated $C_2$–$C_4$ radicals, especially acetylene or optionally substituted phenylene, especially orthophenylene, possible substituents being preferably $C_1$–$C_4$-alkyl, $C_1$–$C_4$-alkoxy, $C_1$–$C_4$-alkoxycarbonyl or phenyl.

Preference is also given in particular to mixtures of these condensates of the formulae (X) and (XI).

The organic thickener of component c) is preferably a completely water-dispersible or water-soluble compound.

The organic thickener of component c) used is preferably a compound whose 4% strength aqueous solution at 20° C. has a viscosity of $\geq 2$ mPa·s.

Preferred organic thickeners of component c) are compounds selected from the following groups:

dextrins or cyclodextrins, starch and starch derivatives, especially degraded or partially degraded starch, anionic polyhydroxy compounds, especially xanthan and also carboxymethylcellulose, cellulose derivatives such as methylcellulose, especially hydroxymethyl-, hydroxyethyl- or hydroxypropylcellulose, partially hydrolysed polymers of vinyl acetate, preferably polyvinyl alcohol, which are hydrolysed to the extent of more than 70%, and/or vinyl alcohol copolymers, preferably copolymers of vinyl acetate and alkyl vinyl esters, which are partially or fully saponified, and also polyvinyl alcohol itself, polymers of N-vinylpyrrolidone, or copolymers with vinyl esters.

Preferred compounds of component c) include starch, derivatized starch and, in particular, degraded starch.

Degraded starch is obtained, for example, by subjecting, for example, natural potato, wheat, maize, rice or tapioca starch to oxidative, thermal, enzymatic or hydrolytic degradation. Preference is given here to oxidatively degraded starches, particular preference to potato starch oxidatively degraded using hypochlorite.

Also suitable, in particular, are dextrins and cyclodextrins. Dextrins are preferably white dextrins, yellow dextrins and maltodextrins having a solubility in cold water of more than 50% by weight, preferably more than 90%, measured with 10 g in 200 ml of water at 20° C.

Preferred cyclodextrins are those of the α-CD type with 6 glucopyranose units, the β-CD type with 7 glucopyranose units and the γ-CD type with 8 glucopyranose units, and also branched AB, AC, AD-diclosyl CDs and mixtures of the said dextrins.

Preferred anionic polyhydroxy compounds include polysaccharides, especially xanthan, and also carboxymethylcellulose.

As cellulose derivatives it is possible to use preferably methylcellulose, hydroxymethylcellulose, hydroxyethyl- and -propylcellulose as component c).

Particularly suitable compounds of component c) include at least partially hydrolysed (saponified) polymers and copolymers of vinyl acetate which are fully dispersible, preferably fully soluble, in water. Preference is given to hydrolysed polymers and copolymers of vinyl acetate with a degree of hydrolysis of from 70 to 97%, preferably from 80 to 92%, a molecular weight of from 1000 to 150,000, preferably from 2000 to 100,000 g/mol, and an efflux viscosity (determined on a 4% strength aqueous solution at 20° C.) of from 2 to 35 mPa·s, preferably from 2 to 10 mPa·s.

Particular preference is given to partially hydrolysed polyvinyl alcohols and also to polyvinyl alcohol itself.

By vinyl acetate copolymers are meant, as component c), in particular, fully or partially saponified vinyl alcohol copolymers, especially fully saponified copolymers of alkylvinyl ester and vinyl acetate having an alkylvinyl ester content of preferably from 5 to 20 mol %, especially copolymers of alkylvinyl acetate and vinyl acetate.

Further suitable compounds of component c) include homopolymers and copolymers of N-vinylpyrrolidone which disperse fully in water.

Advantageous compounds of component c) are polymers having from 35 to 100 mol % fractions of compounds of the general formula

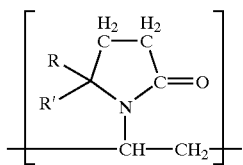

where R, R'=independently of one another, H, methyl or ethyl and 0–65 mol % fraction of one or more monoethylenically unsaturated comonomers, especially vinyl esters such as vinyl acetate, acrylic esters such as ethyl acrylate, methacrylic esters such as methyl methacrylate, vinyl alkyl ethers such as vinyl cyclohexyl ether, vinyl halides such as vinyl chloride, allyl alcohol, acrylonitrile, styrene, vinylcarbazole and others.

The molecular weight of the homopolymers and copolymers of N-vinylpyrrolidone is 2000–150,000, preferably less than 100,000 g/mol.

Very particular preference is given to homopolymers of N-vinylpyrrolidone and also copolymers with vinyl esters.

In accordance with the invention, the abovementioned compounds of component c) may be used alone or in mixtures with one another.

The invention additionally provides solid pigment preparations comprising
 a) at least one pigment,
  b1) at least one condensation product based on
   A) sulphonated aromatics
   B) aldehydes and/or ketones and optionally
   C) one or more compounds selected from the group of unsulphonated aromatics, urea and urea derivatives, and
 c) at least one organic thickener.

Condensation Product of Component b1):

Based on means that the condensation product has optionally been prepared from further reactants besides A, B and optionally C. Preferably, however, in the context of this specification the condensation products are prepared only from A, B and, where appropriate, C.

In the context of this specification, sulphonated aromatics of component A) also include sulphomethylated aromatics. Preferred sulphonated aromatics are: naphthalenesulphonic acids, phenolsulphonic acids, dihydroxybenzenesulphonic acids, sulphonated ditolyl ethers, sulphomethylated 4,4'-dihydroxydiphenyl sulphone, sulphonated diphenylmethane, sulphonated biphenyl, sulphonated hydroxybiphenyl, especially 2-hydroxybiphenyl, sulphonated terphenyl or benzenesulphonic acids.

Particularly suitable aldehydes and/or ketones of component B) include aliphatic, cycloaliphatic and also aromatic ones. Aliphatic aldehydes are preferred, suitable aldehydes including with particular preference formaldehyde and also other aliphatic aldehydes having from 3 to 5 carbon atoms.

Examples of suitable unsulphonated aromatics of component C) are phenol, cresol, 4,4'-dihydroxydiphenyl sulphone or dihydroxydiphenylmethane.

Urea derivatives which may be mentioned include dimethylolurea, melamine or guanidine, for example.

A preferred condensation product of b1) that is used is one based on
 A) at least one sulphonated aromatic selected from the group of naphthalenesulphonic acids, phenolsulphonic acids, dihydroxybenzene-sulphonic acids, sulphonated ditolyl ethers, sulphomethylated 4,4'-dihydroxydiphenyl sulphone, sulphonated diphenylmethane, sulphonated biphenyl, sulphonated hydroxybiphenyl, especially 2-hydroxybiphenyl, sulphonated terphenyl and benzenesulphonic acids,
 B) formaldehyde and optionally
 C) one or more compounds selected from the group of phenol, cresol, 4,4'-dihydroxydiphenyl sulphone, dihydroxydiphenylmethane, urea, dimethylol-urea, melamine and guanidine.

The condensation product which is preferably obtained in the condensation preferably possesses an average degree of condensation of from 1 to 150, with particular preference from 1 to 20, in particular from 1 to 5.

The condensation products of component b1) may be used as aqueous solutions or suspensions or as solids, for example as powders or granules, preferably spray-dried powders or granules.

Preferred condensation products of component b1) have an inorganic salt content of less than 10% by weight, preferably less than 5% by weight, in particular below 1% by weight, based on the aqueous solution or suspension of the component that is used or based on the solid of component b1) that is used.

It is likewise preferred to use condensation products of component b1) which are low in or free from residual monomers.

By "low-monomer" is meant a residual monomer content of less than 30% by weight, preferably less than 20% by weight, based on the condensation product, in particular <10% by weight, preferably <5% by weight. By residual monomers in this context are meant the reactants used to prepare the condensation product.

Low-salt and low-residual-monomer condensation products of this kind are known, for example, from EP-A 816 406.

Condensation products of component b1) may be prepared, for example, by first preparing the sulphonated aromatics of component A) alone or in a mixture with unsulphonated aromatics of component C) by reacting the parent aromatics with a sulphonating agent, preferably sulphuric acid, especially concentrated sulphuric acid, chlorosulphonic acid, amidosulphonic acid or oleum.

It is preferred to use from 0.4 to 3.2 mol, in particular from 0.8 to 1.6 mol, of sulphonating agent per mole of the parent aromatic of component A).

This is followed by condensation with aldehydes and/or ketones of component B), preferably formaldehyde, alone or together with further compounds of component C). The condensation takes place preferably in aqueous solution at a pH of from 0 to 9. In this case it is preferred to use from 0.4 to 1.5 mol, in particular from 0.4 to 1.0 mol, of component B) per mole of the sulphonated aromatic A) or, respectively, per mole of a mixture of sulphonated aromatics of component A) and unsulphonated aromatics of component C).

This is followed, optionally, by neutralization of the sulphonic-acidic condensation product of component b1) with a base.

The separation of the inorganic acid or its salts and the reduction in the residual monomer content may be carried out, for example, by means of membrane separation techniques. Preferred membrane separation techniques suitably include ultrafiltration, diffusion dialysis or electrodialysis.

The membranes used in the case of the membrane separation techniques, preferably in the ultrafiltration, in one preferred embodiment possess a molecular weight cut-off (MWCO) of from 1000 to 10,000 daltons.

The separation of the inorganic acid by means of a membrane separation technique takes place preferably by means of diafiltration with acid-stable ultrafiltration or nanofiltration membranes in cross-flow filtration mode. Examples of suitable membranes include polyhydantoin membranes, as known from EP-A 65 20 44.

Preferred membranes for this purpose possess an MWCO level of from 2000 to 10,000 daltons. If desired, concentration takes place at the same time during this process step.

The invention additionally provides solid pigment preparations comprising
a) at least one pigment
b2) at least one compound from the group of phosphoric acid, phosphonic acid and/or derivatives thereof,
c) at least one organic thickener.

Compounds of the group b2) embrace phosphoric acid derivatives and phosphonic acid derivatives, such as for example the reaction products of phosphoric acid or phosphonic acid with polyols and/or monoalcohols.

Phosphoric acid derivatives are preferably phosphoric monoesters and diesters of the general formula

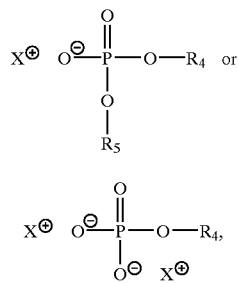

where
$R_4$ and $R_5$ independently denote an organic radical having 1–20 carbon atoms and
$X^\oplus$ represents H, or a monovalent cation.

Preferred compounds of the formula III or IV are the alkali metal salts of phosphoric diesters having $C_6$–$C_{10}$ aliphatic radicals, especially sodium dioctyl phosphate.

Phosphonic acid derivatives are preferably compounds of the general formula

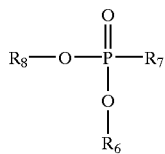

in which
$R_6$ represents H, or an organic radical having 1–20 carbon atoms,
$R_7$ denotes $C_{11}$–$C_{22}$-alkyl or cycloalkyl, $C_7$–$C_{18}$-aralkyl, or a radical of the general formula

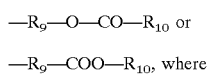

—$R_9$—O—CO—$R_{10}$ or

—$R_9$—COO—$R_{10}$, where $R_9$ denotes an optionally substituted $C_2$–$C_4$-alkylene radical, and
$R_{10}$ denotes a $C_6$–$C_{22}$-alkyl, cycloalkyl or alkylene radical;

in particular, $R_7$ may be a radical of $C_4$–$C_7$ dicarboxylic or tricarboxylic acid or derivatives thereof (e.g. esters), for example the radical of butane-1,2,4-tricarboxylic acid, ethanedicarboxylic acid or derivatives thereof. (Such compounds of the formula V may be obtained, for example, by addition reaction of phosphites with unsaturated dicarboxylic or tricarboxylic acid (or derivatives thereof).)

$R_8$ represents H or $CH_3$.

Preferred compounds are phosphonosuccinic acid or phosphono-1,2,4-tricarboxylic acid.

The derivatives may be used in particular in the form in which they are neutralized with monovalent bases.

Reaction products of the said compounds are obtained by reacting phosphonic acid derivatives, for example their esters based on low-boiling alcohols, with polyols and/or alcohols. Suitable polyols are polyethylene and/or polypropylene glycols having 2–50 mole units, in particular 5–20 mole units, of alkylene oxide.

Suitable alcohols are straight-chain, branched or cyclic-aliphatic $C_6$–$C_{22}$ alcohols or mixtures thereof, preferably fatty alcohols.

With particular preference the reaction products correspond to the general formula

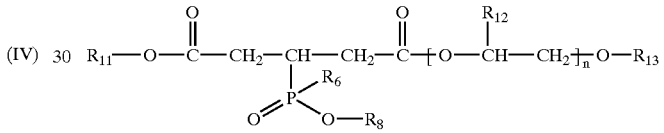

where
$R_6$ and $R_8$ are as defined above,
$R_{11}$ is $C_6$–$C_{22}$ alcohol, preferably aliphatic or cycloaliphatic alcohols, especially fatty alcohols,
n is 1–10,
$R_{12}$ is H or $CH_3$,
$R_{13}$ is H or $CH_3$.

The reaction products may be used as desired in the form in which they are neutralized with monovalent bases.

Very particular preference is given to pigment preparations comprising the components a), b2) and c) and comprising an inorganic pigment as component a).

For the three pigment preparations of the invention, the abovementioned preference forms apply equally to components a) and c). Unless stated otherwise, the remarks made per se regarding the pigment preparations of the invention also apply equally to both preparations.

As additional dispersants, the pigment preparations of the invention may comprise those of component d), for example those specified below.

d1) Alkoxylation products obtainable by condensing phenolic OH-containing aromatics with formaldehyde and NH-functional groups.

Preference is given to alkoxylation products of the kind obtainable by condensing phenolic OH-containing aromatics with formaldehyde and amines containing a formaldehyde-reactive NH group, or derivatives of such alkoxylation products. In this context, preference is given to those obtained by alkoxylating compounds of the formula (II)

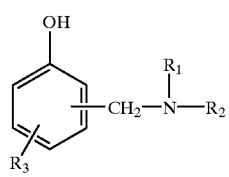

(II)

in which
- R₁ denotes the monovalent radical of an optionally substituted aliphatic, cycloaliphatic or aromatic hydrocarbon,
- R₂ denotes hydrogen or the monovalent radical of an optionally substituted aliphatic, cycloaliphatic or aromatic hydrocarbon, and
- R₃ denotes hydrogen, $C_1$–$C_{20}$-alkyl, $C_5$–$C_7$-cycloalkyl, phenyl, benzyl, halogen, hydroxyl, $C_1$–$C_{18}$-alkoxy, carboxyl or $C_1$–$C_{18}$-alkoxycarbonyl, alkoxylating reagents used comprising preferably ethylene oxide, propylene oxide, butylene oxide, styrene oxide, glycide or mixtures of these compounds, but especially ethylene oxide, optionally together with propylene oxide. Alkoxylation products of this kind are described, for example, in DE 27 11 240.

d2) Water-soluble polyisocyanate adducts containing hydrophilic polyether chains and preferably having a maximum isocyanate group content of 1.0% by weight, containing 30–99.5% by weight of ethylene oxide units arranged within polyether chains and incorporated by way of monofunctional alcohols, and an ionic group content of 0–200 milliequivalent/100 g polyisocyanate adduct;

dispersants of this kind are disclosed, for example, in DE-A 1 963 382.

Preferred polyisocyanate adducts of component d2) are prepared, for example, observing an NCO index of from 100 to 130, by reacting A) a polyisocyanate component with an average NCO functionality of from 3.0 to 6 and an NCO content of from 7 to 30% by weight, consisting of isocyanurate group-containing modification products of 2,4-diisocyanatotoluene or its mixtures with up to 35% by weight, based on the mixture, of 2,4-diisocyanatotoluene, with B) from 50 to 90 equivalent-%, based on component A), of a monohydric alcohol component consisting of at least one monohydric polyether alcohol from the molecular weight range from 150 to 10,000, preferably from 150 to 5000 g/mol, containing from 40 to 99.5% by weight of ethylene oxide units, and prepared by alkoxylating a monovalent starter molecule, C) from 0 to 20 equivalent-%, based on the isocyanate groups of A), of a monovalent compound containing isocyanate-reactive groups and from the molecular weight range from 32 to 5000 g/mol, additionally containing ionic groups, and D) from 10 to 50 equivalent-%, based on component A), of an amine component consisting of at least one tertiary amine in the molecular weight range from 88 to 250 g/mol containing a group which is reactive towards isocyanate groups in the sense of the NCO addition reaction, with urethane formation, and, if desired, secondary reactions conducted simultaneously with or subsequent to the urethane formation in order to reduce the level of any excess NCO groups present down to a residual content of not more than 1.0% by weight, the nature and proportions of the starting components being chosen so that the reaction product contains from 40 to 75% by weight of ethylene oxide units incorporated by way of component B).

Likewise preferred polyisocyanate adducts of component d2) are prepared, for example, observing an NCO index of from 131 to 600, by reacting A) a polyisocyanate component having an average NCO functionality of from 1.7 to 2.5 and an NCO content of from 30 to 65% by weight, consisting of at least one isocyanurate from the following group: 2,4-diisocyanatotoluene, 2,6-diisocyanatotoluene, 4,4'-diisocyanatodiphenylmethane, 2,4'-diisocyanatodiphenylmethane with B) from 5 to 50 equivalent-%, based on component A), of an alcohol component of the type specified under B) above, C) from 0 to 10 equivalent-%, based on the isocyanate groups of A), of a monovalent compound containing isocyanate-reactive groups and from the molecular weight range from 32 to 5000 g/mol, additionally containing ionic groups, and D) from 0 to 20 equivalent-%, based on component A), with an amine component of the type specified under D) above, with urethane formation, and, if desired, secondary reactions carried out simultaneously or subsequently to the urethane formation in order to reduce the level of any excess NCO groups present down to a residual content of not more than 1.0% by weight, the nature and proportions of the starting components being chosen so that the reaction product contains from 40 to 75% by weight of ethylene oxide units incorporated by way of component B).

With particular preference, the abovementioned pigment preparations of the invention comprise as dispersants of component d2) a polyisocyanate adduct containing from 10 to 50 milliequivalents of ionic groups per 100 g of component d2).

d3) Water-soluble inorganic salts, especially borates, carbonates, silicates, sulphates, sulphites, selenates, chlorides, fluorides, phosphates, nitrates and aluminates of the alkali metals and alkaline earth metals and of other metals, and also ammonium;

compounds from the group of the water-soluble salts are used preferably for preparing the preparations of the invention based on inorganic pigments or fillers (Comp. A). This group includes sulphates, chlorides, fluorides, nitrates, carbonates, silicates, phosphates, sulphites, selenates, aluminates, borates of the alkali metals and the alkaline earth metals and of other metals (e.g. aluminium and iron) and also of ammonium. Magnesium sulphate is particularly preferred.

d4) Polymers composed of repeating succinyl units, especially polyaspartic acid.

In one preferred embodiment, the polymers of component d4) contain repeating succinyl units having one of the following structures:

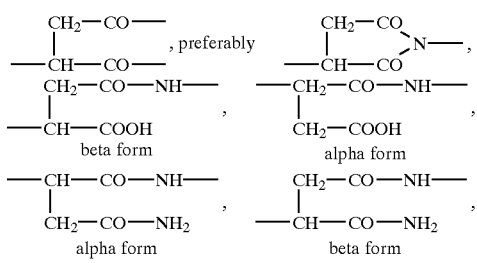

which structures may optionally be present in salt form.

By α or β form, respectively, is meant the peptide linkages present as a result of the carboxyl groups in α or β position.

Additionally it is possible, by appropriate reaction regime and choice of reactants, for further repeating units to be present, e.g.

a) malic acid units of the formula

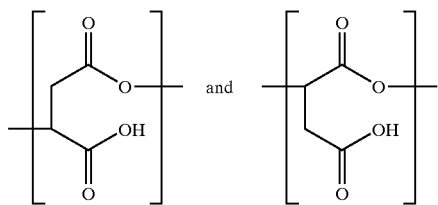

b) Maleic acid and fumaric acid units of the formula

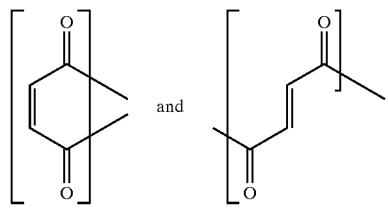

c) iminodisuccinate units of the formula

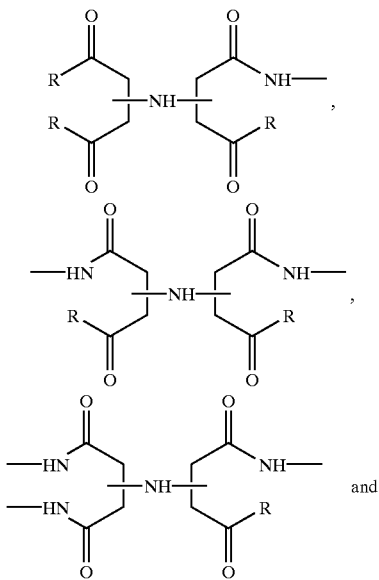

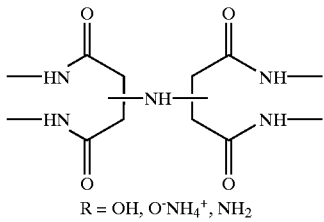

R = OH, O⁻NH₄⁺, NH₂

The analysis of the chemical structure takes place preferably by $^{13}$C-NMR, FT-IR and, after total hydrolysis, by HPLC, GC and GC/MS.

In many preparation processes, it is not the straight acids which are obtained but instead, initially, the corresponding anhydrides, for example polysuccinimide (PSI). Such polymerization products may be converted into a salt by reaction with a base, optionally in the presence of water. This transformation takes place subsequently in a suitable apparatus by hydrolysis. Preference here is given to a pH between 5 and 14. In a particularly preferred form, a pH of from 7 to 12 is chosen, in particular by the addition of a base. Suitable bases are alkali metal and alkaline earth metal hydroxides or carbonates such as, for example, sodium hydroxide, potassium hydroxide, sodium carbonate or potassium carbonate, ammonia and amines such as triethylamine, triethanolamine, diethylamine, diethanolamine, alkylamines, etc.

Besides free acids, particular preference is given to their Na, K or Ca salts.

The temperature during the hydrolysis is appropriately situated in a range up to and including the boiling point of the PSI suspension and preferably from 20 to 150° C. If desired, the hydrolysis is conducted under pressure.

It is, however, also possible to obtain the free acid, especially polyaspartic acid, by purely aqueous hydrolysis or treatment of the salt with the acids or acidic ion exchangers. The term polyaspartic acid (=PAS) in the case of the present invention likewise embraces the salts, unless expressly stated otherwise.

The polymers of comp. d4) may be used in the form of an aqueous solution or suspension, or as a solid or else as powder or granules, preferably as spray-dried powder or granules.

Preferred polymers have a molecular weight by gel permation chromatographic analyses of Mw=500 to 10,000, preferably 70 to 5000, with particular preference 1000 to 4500. In general the fraction of the beta form is more than 50%, preferably more than 70%.

The crude polymers may be freed from monomeric fractions by customary methods of working up, for example by extraction with water and 1 N hydrochloric acid or by membrane separation techniques. Suitable membrane separation techniques have already been described in connection with comp. b1).

The preparation of the polymers of component d4) containing repeating succinyl units, especially of α/β-polyaspartic acids and polysuccinimides, is known per se; see U.S. Pat. No. 4,839,461 (=EP-A 0 256 366).

Furthermore, further additional dispersants of the group d5) may be used in the pigment preparations of the invention, and are advantageous for the dispersing of the pigments in the course of the preparation process.

These dispersants may be nonionic, anionic, cationic or amphoteric compounds.

Examples of nonionic dispersants of component d5) include the following: alkoxylates, alkylolamides, esters, amine oxides and alkyl polyglycosides.

Suitable nonionic dispersants also include the following: reaction products of alkylene oxides with alkylatable compounds, such as fatty alcohols, fatty amines, fatty acids, phenols, alkylphenols, carboxamides and resin acids. These products comprise, for example, ethylene oxide adducts from the class of the reaction products of ethylene oxide with:

a) saturated and/or unsaturated fatty alcohols having from 6 to 20 carbon atoms
or
b) alkylphenols having from 4 to 12 carbon atoms in the alkyl radical or
c) saturated and/or unsaturated fatty amines having from 14 to 20 carbon atoms
or
d) saturated and/or unsaturated fatty acids having from 14 to 20 carbon atoms or
e) hydrogenated and/or unhydrogenated resin acids,
f) esterification and/or arylation products which have been prepared from natural or modified, optionally hydrogenated castor oil fatty substances and which if desired have been linked to form repeating structural units by esterification with dicarboxylic acids.

Particularly suitable ethylene oxide adducts are the alkylatable compounds specified under a) to e) with from 5 to 120, preferably from 5 to 60, in particular form 5 to 30 mol of ethylene oxide.

Nonionic polymeric dispersants are particularly preferred.

Examples of suitable polymeric dispersants include water-soluble and also water-emulsifiable compounds, e.g. homopolymers and copolymers, graft polymers and graft copolymers, and random block copolymers.

Particularly preferred polymeric dispersants are, for example, AB, BAB and ABC block copolymers. In the AB or BAB block copolymers, the A segment is a hydrophobic homopolymer or copolymer which secures a bond to the pigment and the B block is a hydrophilic homopolymer or copolymer or a salt thereof and ensures the dispersing of the pigment in the aqueous medium. Polymeric dispersants of this kind and their synthesis are disclosed, for example, in EP-A-518 225 and EP-A-556 649.

Further examples of suitable polymeric dispersants are polyethylene oxides, polypropylene oxides, polyoxymethylenes, polytrimethylene oxides, polyvinyl methyl ethers, polyethyleneimines, polyacrylic acids, polyacrylamides, polymethacrylic acids, polymethacrylamides, poly-N,N-dimethylacrylamides, poly-N-isopropylacrylamides, poly-N-acryloylglycinamides, poly-N-methacryloylglycinamides, polyvinyloxazolidones and polyvinylmethyloxazolidones.

Examples of anionic dispersants are alkyl sulphates, ether sulphates, ether carboxylates, phosphate esters, sulphosuccinate amides, paraffinsulphonates, olefinsulphonates, sarcosinates, isethionates and taurates.

Anionic polymeric dispersants are particularly preferred.

Further suitable products include condensation products obtainable by reacting naphthols with alkanols, adding on alkylene oxide and at least partly converting the terminal hydroxyl groups into sulpho groups, or monoesters of maleic acid, phthalic acid or succinic acid.

Also suitable are dispersants from the group of the sulphosuccinic esters and also alkylbenzenesulphonates. Ionically modified, alkoxylated fatty acid alcohols or their salts as well. By alkoxylated fatty acid alcohols are meant in particular those $C_6$–$C_{22}$ fatty acid alcohols containing from 5 to 120, preferably from 5 to 60, in particular from 5 to 30 ethylene oxide units and being saturated or unsaturated, especially stearyl alcohol. Particular preference is given to a stearyl alcohol alkoxylated with from 8 to 10 ethylene oxide units. The ionically modified alkoxylated fatty acid alcohols are preferably in salt form, in particular as alkali metal or amine salts, preferably as the diethylamine salt. By ionic modification is meant, for example, sulphation, carboxylation or phosphation.

Further examples of anionic polymeric dispersants are the salts of polyacrylic acids, polyethylenesulphonic acids, polystyrenesulphonic acids, polymethacrylic acids, polyphosphoric acids.

Additional examples of anionic polymeric dispersants are copolymers of acrylic monomers, which are indicated by way of example in the table below by combination of the following monomers, which are synthesized into random, alternating or graft copolymers:

acrylamide, acrylic acid;
acrylamide, acrylonitrile;
acrylic acid, N-acryloylglycinamide;
acrylic acid, ethyl acrylate;
acrylic acid, methyl acrylate;
acrylic acid, methylenebutyrolactam;
N-acryloylglycinamide, N-isopropylacrylamide;
methacrylamide, methacrylic acid;
methacrylic acid, benzyl methacrylate;
methacrylic acid, diphenylmethyl methacrylate;
methacrylic acid, methyl methacrylate;
methacrylic acid, styrene.

Further anionic polymeric dispersants are styrene-maleic anhydride copolymers, copolymers thereof with the above-mentioned acrylic monomers, and also polyurethane-based polymers.

Also suitable are lignin-type compounds, especially ligninsulphonates, e.g. those obtained by the sulphite or kraft process. The products in question are preferably partially hydrolysed, oxidized, propoxylated, sulphonated, sulphomethylated or disulphonated and fractionated by known processes, for example by molecular weight or by degree of sulphonation. Mixtures of sulphite and kraft ligninsulphonates are also highly effective. Particularly suitable ligninsulphonates are those having an average molecular weight of more than 1000 to 100,000, an active ligninsulphonate content of at least 80% and preferably a low polyvalent cation content. The degree of sulphonation may vary within wide limits.

Examples of cationic dispersants include the following quaternary alkylammonium compounds and imidazoles.

Cationic polymeric dispersants are particularly preferred.

Examples of cationic polymeric dispersants are the salts of polyethyleneimines, polyvinylamines, poly(2-vinylpyridines), poly(4-vinylpyridines), poly(diallyldimethylammonium) chloride, poly(4-vinylbenzyltrimethylammonium) salts, poly(2-vinylpiperidine).

Examples of amphoteric dispersants include the following: betaines, glycinates, propionates and imidazolines.

Anionic and cationic polymers are summarized as polyelectrolytes and are partly or fully dissociable in an aqueous and/or organic phase.

The pigment preparations of the invention comprising a), b) and c) may additionally comprise, as further dispersants, those of component b1) and/or b2), and vice versa.

With regard to the indicated amounts of these respective other dispersant components, the same comments apply to them as to the dispersants of component d).

The pigment preparations of the invention are preferably in the form of their cubic, spherical or beadlike granules. They preferably possess an average particle size of from 20 to 5000 µm, in particular 50–2000 µm (determined from the mass distribution, e.g. sieve analysis).

In one preferred embodiment the pigment preparations of the invention contain

20–98% by weight, preferably 30–95% by weight of component a)

0.1–100% by weight, preferably 0.5–60% by weight of component b) and/or of component b1) and/or of component b2), based on pigment of component a) 0.1–4 mg/m², preferably 0.1–2 mg/m² of component c), based on the specific surface area of the pigment of component a)

and also

0–15% by weight, preferably 0.2–5% by weight of water, based on pigment of component a).

Additionally, the pigment preparations of the invention may contain

0–100% by weight, preferably 0–50% by weight, in particular 0.1–45% by weight of component d), based on pigment of component a), and also 0–10% by weight, preferably 0–5% by weight of further additives, based on pigment of component a).

If desired, in addition to or instead of the further dispersants of component d), especially when using inorganic pigments or fillers, it is possible to use liquefiers of component e) in the course of the preparation of the preparations of the invention, especially during or before pigment dispersion and/or before drying, although these liquefiers undergo at least partial thermal decomposition or evaporation in the course of drying or granulation.

Organic compounds and organometallic compounds used for liquefying are preferably formic, tartaric, citric and also oxalic acid and salts thereof or derivatives thereof (e.g. esters, acid chlorides, etc.).

Further liquefiers are organic or inorganic bases, especially ammonia.

These liquefiers are used preferably before or during pigment dispersion, in particular before drying, in which case a pH of the pigment dispersion prior to drying is preferably from 3 to 12, in particular 4–11.

Additionally it is possible prior to drying to use nonvolatile amines such as, for example, ethanolamine, diethanolamine, triethanolamine, dimethylethanolamine, methyldiethanolamine, or ε-caprolactam, in order to adjust the pH of the pigment preparation of the invention after drying to a value from 7 to 9.

The organic thickeners, preferably fully water-dispersible or water-soluble compounds of component c), are preferably nonionogenic or anionogenic in nature and fulfil the function of stabilizing the pigment particles during dispersion in conjunction with compounds of component b) and/or, if desired, of component d) and/or, if desired, the abovementioned liquefiers of component e). Furthermore, they may serve to adjust the viscosity during or after dispersion. In the wider sense, moreover, they may act as protective colloids for the finely dispersed pigment particles in the pigment preparations of the invention during or after drying and as auxiliaries for improving the general compatibility and redispersibility in the various kinds of aqueous application media.

Excessive proportions of compounds of component c), however, may in certain cases be accompanied by disadvantages in respect of the economic conduct of the process, and/or unwanted side effects in the application media (e.g., thickening when employed at excessive concentrations).

In accordance with the invention, the amount of component c) that is added is guided preferably by the specific surface area of the pigments in their finely divided form. In particular the ratio of the amount of component d), based on the specific surface area of the pigment (B.E.T. method), is less than 4 mg/m², preferably less than 2 mg/m².

Further customary adjuvants present may be, for example, wetting agents, antifoams, anticaking agents.

It is also possible where necessary for nonvolatile solvents to be present, examples being polyetherpolyols in the form of their homopolymers, copolymers and block copolymers having a boiling point under atmospheric pressure of more than 150° C., preferably more than 250° C.

Also suitable are preservatives and sterilizers which are needed for the sterile conduct of the preparation process.

It is also possible if desired to use oleophobicizers.

The invention also provides a process for preparing the pigment preparations of the invention.

The preparing is generally done by introducing and homogenizing the solids of component a) in the form of its finished or unfinished powder or water-moist presscake into a homogeneous mixture of water or aqueous-organic medium, at least a portion of component b) and/or b1) or b2), a portion if desired of the other components c), d) and further additives and liquefiers e), and dispersing or converting the formulation into the desired state of fine division of the particulate solids by means of continuous or discontinuous wet comminution techniques such as, for example, stirrer or dissolver homogenization, grinding, kneading or high-pressure homogenisation, it being possible to add, where appropriate, a portion of components b) and/or b1) or b2), c), d) and liquefier e) in the course of the dispersion.

Subsequently the resulting dispersion is made up, where appropriate, with further water or aqueous-organic medium, with the requisite fractions of components b) and/or b1) or b2), c), d) where appropriate, and further additives where appropriate, and by means of an appropriate technique for the pigment preparation of the invention is dried to a residual moisture content of less than 15% by weight, preferably less than 5%.

Component c) is added preferably either wholly or partly before or during the pigment dispersing operation, or wholly or partly following the pigment dispersing operation, before drying.

Suitable drying techniques include the following: spray drying, especially single-fluid spray drying by means of high-pressure and/or swirl-chamber nozzles, plate spray drying, spray drying with integrated or downstream fluid-bed agglomeration and/or fluid-bed drying, freeze drying with upstream or downstream granulation, buildup granulation, for example by the plate or drum granulation process, optionally with partially predried product, fluidized-bed drying and granulation, mixer agglomeration and mixer drying, optionally in combination with fluidized-bed or fluid-bed drying, mix agglomeration in suspension with downstream fluidized-bed or fluid-bed drying, granulation by means of paste forming with downstream after-drying and comminution, and steam jet agglomeration.

Combinations of the techniques mentioned are likewise possible.

Particular preference is given to the techniques of spray drying by means of swirl-chamber nozzles, spray drying with integrated or downstream fluidized-bed agglomeration and/or drying, buildup granulation by the plate method, and also fluidized-bed granulation and drying.

If desired, fractions of the other components may also be introduced directly before or during the drying and granulation process.

The wet comminution in the case of organic pigments and carbon black of component a) generally includes the pre-comminution by means, for example, of high-speed stirrers or dissolvers and also a fine grinding by means, for example, of compounders, roll mills, kneading screws, ball mills, vibratory mills and, in particular, high-speed stirred mills containing grinding media having a diameter of preferably from 0.1 to 2 mm. The grinding media may be of glass, ceramic, metal, e.g. steel, or plastic. The milling temperature in the course of the wet comminution is preferably below 250° C., generally below 60° C., but in particular below the cloud point of the compounds of component b), c) and e) employed.

Sufficient fine division of the organic pigments in general is achieved when the average particle size of the pigments (primary particles and/or aggregates) is less than 3 $\mu$m, preferably less than 1 $\mu$m (ex mass distribution).

The drying and granulation of organic pigments in particular takes place preferably at a temperature of the drying gases (generally air) of 70–220° C., in particular 80–180° C. (gas entry temperature).

In a likewise preferred procedure, the fine grinding may take place wholly or partly in a high-pressure homogeneous mixer or in a jet disperser (known from DE-A 19 526 845).

Wet comminution in the case of inorganic pigments and fillers may take place in principle in the same way as described above, preferably by the procedure applying to organic pigments.

In general, however, dispersing operations by means of high-speed stirring units, dissolvers, rotor-stator mills, and corundum disc mills are sufficient to achieve the desired fine division, given appropriate consistency (viscosity) and, in general, high pigment content (>40% by weight) of the pigment suspension.

In a number of cases it is also possible to take slurries directly from the preparation processes of the pigments or fillers, especially in the case of extender pigments and in some cases inorganic oxide pigments, to mix these slurries with the individual components and then—without wet comminution—to carry out drying to give granules.

The drying gas temperature in the case of inorganic pigments is generally less than 440° C., in particular 70–300° C.

The pigment preparations of the invention in the form of their granules are preferably notable for:
- a pigment content higher than that of liquid preparations,
- very little dusting, if any, on handling and application,
- excellent abrasion resistance and minimal tendency to undergo compaction and/or caking,
- uniform particle size distribution and good pourability, free flow and meterability,
- substantially free from preservatives and also agents for increasing the resistance to freezing and/or drying up,
- very good storage properties,
- economic and environmental advantages in terms of packaging, storage and transportation, such as packaging in paper bags, for example.

Moreover, they are easy to introduce into water or aqueous application systems and—like comparable liquid preparations—can be distributed and mixed in with very low energy input, by stirring, for example.

In the emulsion paints encountered in practice, both colourless and white (customarily containing $TiO_2$, $BaSO_4$ or other inorganic extenders), based on polymeric binder dispersions in the form, inter alia, of acrylates, styrene acrylates, polyvinyl acetates, polyurethanes and polysiloxanes, and also in silicate dispersion paints, the pigment preparations of the invention are notable for outstanding compatibility and give flocculation-stable, speck-free and streak-free coatings. The colour development—colour strength, brilliance, shade, optionally hiding power—of the pigment preparations of the invention comprising an organic or inorganic colour pigment is at least equal to if not better than that of dispersed liquid pigment preparations given equal amounts in both cases of colour pigment of component a).

The pigment preparations of the invention are also outstandingly suitable for colouring and pigmenting other, water-dilutable coating systems, such as water-dilutable varnishes, based for example on alkyd resin emulsions, water-dilutable baking enamels, and water-dilutable two-component polyurethane coating materials, for example.

Owing to the high pigment contents of the pigment preparations of the invention and the substantial absence of wet binders or rheological additives of the customary liquid preparations, it is possible to achieve higher levels of colouring and filling of the coating compositions without adverse effects on their rheology or performance.

The use of the pigment preparations of the invention in aqueous binder systems (e.g. in emulsion paints, dispersion plasters, printing inks, lacquer paints and other coating systems) is preferably characterized in that the amount of the pigment preparation(s) of the invention required to give the desired shade and colour strength is introduced into the aqueous binder system by hand or mechanically by means of stirring apparatuses, for example, said binder system optionally containing finely dispersed $TiO_2$, $BaSO_4$ or other inorganic white or chromatic pigments, and is homogeneously distributed therein, together if desired with further customary additives and coating onto the various substrates is carried out by means of generally known processes such as brushing, spraying, rolling, knife coating and dipping, for example.

Furthermore, the pigment preparations of the invention, especially those based on inorganic pigments and carbon black, are highly suitable for colouring building materials such as concrete, asphalt and cement mortar mixtures, for example, for producing architectural preservatives, for colouring sealing compounds (e.g. acrylic) and for colouring other cement-based building materials.

The pigment preparations of the invention are especially suitable for the colouring, including shading, of paper in the pulp, coloured paper coating slips, and also nonwovens and films, examples including cellulose acetate films. They are also suitable for colouring polymer solutions, especially for spin dyeing of fibres such as polyacrylic fibres, for example.

The colouring of paper in the pulp is preferably characterized in that in a first step, for example, pulp or a pulp mixture, together with water, customary fillers such as inorganic white pigments, calcium carbonate, or kaolin, for example, the pigment preparations of the invention (with organic or inorganic colour pigments as component a)) and also, optionally, customary auxiliaries such as sizes, wet strength agents, defoamers, for example, are beaten in appropriate apparatus such as, for example, hollanders, pulpers or mixing vats with sufficient turbulence, after which (step 2) the composition is diluted further by adding water, optionally further customary auxiliaries such as wet strength agents, retention agents, pH modifiers, for example, and thereafter (step 3) the resultant composition is supplied to the headbox of a paper machine, on which sheet forming and drying to give the desired paper take place. The pigment preparation of the invention may also be added following step 1 in the mixing vat or in conjunction with step 2.

In this context, the pigment preparations of the invention are notable for outstanding retention behaviour (high colour yield) and low foaming tendency during the production process. Even at high levels of more than 10% by weight of the pigment preparations, based on pulp, the foaming tendency is sufficiently low that the use of defoamers may be reduced to a minimum.

EXAMPLE 1

Yellow Pigment Preparation Based on C.I. Pigment Yellow 74

In a high-speed stirrer, 13.2 parts of deionized water are introduced and 0.5 part of a partially hydrolysed polyvinyl alcohol (Airvol® 523, Air Products) was dissolved at a temperature of 70° C. and then, after cooling to room temperature, 2.5 parts of a 60% strength aqueous solution of an alkoxylation product of formula (X) prepared by condensing 2.7 mol of vinyltoluene with 1 mol of phenol followed by reaction with 50 mol of ethylene oxide were introduced with stirring and also 5.0 parts of the organic powder pigment C.I. Pigment Yellow (74) (hiding) were introduced and homogenized, the pH being adjusted to 7 by means of dilute sodium hydroxide solution.

The composition was subsequently subjected to bead milling with cooling on a horizontal, closed stirred bead mill with a disc stirrer unit, using glass beads (0.47–0.63 mm diameter), grinding charge 70% by volume, milling chamber volume 2 liters, throughput 7 kg/h in 3 passes.

This gave a pigment suspension with a high level of fine division, no longer containing any particles over 1 $\mu$m.

The suspension was adjusted with further water to a dry-matter content of 20.6% and was subsequently dried on a single-fluid spray dryer with the following settings:

Nozzle: swirl chamber nozzle with 1.09 mm bore

Nozzle pressure: 29 bar

Nozzle throughput: 97 kg/h

Air entry temp.: 160° C.

Air exit temp.: 64° C.

The results were dust-free granules having very good free-flow properties, an average particle size (ex mass distribution) of approximately 220 $\mu$m, and the following composition:

| | |
|---|---|
| 70.0% | Pigment C.I. Pigment Yellow 74 |
| 21.0% | Compound of formula (X) |
| 7.0% | Polyvinyl alcohol |
| 2.0% | Residual moisture (water) |

The resulting pigment preparation of the invention exhibited very good compatibility in commercially customary aqueous, solvent-free and partially solvent-containing white emulsion paints. It was easy to stir into the white paints, by hand for example, and gave strongly coloured, flocculation-stable and speck-free coatings whose colour development could not be substantially improved even by subsequent stirring for 2 minutes using a high-speed stirrer. Pigmentations with more than 10 parts of the preparation in 100 parts of the white paints were possible.

By comparison, a commercially customary liquid preparation of the same colour pigment (Example 8 from DE-A 19511 624, pigment content 35%) was prepared by the process as described above. Drawdown evaluation was made by introducing 1.5 parts of the preparation of the invention against 3 parts of the comparative preparation in 100 parts (in each case) of a commercially customary white paint by manual stirring (2 minutes) and drawdown onto a white test card using a 100 $\mu$m coater. Colorimetry by means of the Cielab system gave the following results:

| | Comparative Liquid | Preparation Granules |
|---|---|---|
| Colour strength (%) | 100 | 104 |
| Residual colour difference dE | — | 0.4 |

Similarly, even after storage at 50° C. for 4 weeks in comparison to storage at room temperature, the preparation showed only a small drop in colour strength in the drawdown test method, of less than 2%.

The pigment preparation was also easy to incorporate into the following commercially customary coating systems, and exhibited good compatibility therein:

Alkyd resin emulsion varnish (aqueous, colourless)

2K PU topcoat (water-dilutable, white)

Baking enamel (water-dilutable, white)

EXAMPLE 2

Violet Pigment Preparation Based on C.I. Pigment Violet 23

In a high-speed stirrer,

| | |
|---|---|
| 20.6 parts | of deionized water are introduced and |
| 2.9 parts | of the same alkoxylation product of formula (X) from Example 1, |
| 7.3 parts | of an oxalkylation product of castor oil with 30 mol units of ethylene oxide and |
| 35.8 parts | of the presscake of the organic colour pigment C.I. Pigment Violet 23, with a dry-matter content of 52.6% by weight, were introduced and homogenized, the pH being adjusted to 7 by means of dilute sodium hydroxide solution. |

The composition was subsequently subjected to bead milling with cooling under the same conditions as described in Example 1.

This gave a pigment suspension with a high level of fine division, no longer containing any particles over 1.0 $\mu$m.

| | |
|---|---|
| 61.0 parts | of the resulting mill suspension were mixed on a high-speed stirrer with |
| 28.0 parts | of a 10% strength aqueous solution of a partially hydrolysed polyvinyl alcohol (Mowiol® 4-88, Hoechst) to give a pigment suspension having a dry-matter content of 32.4%. |

This was followed by drying on a single-fluid spray dryer with the following settings:

Nozzle: swirl chamber nozzle with 1.09 mm bore

Nozzle pressure: 6 bar

Nozzle throughput: 114 kg/h

Air entry temp.: 80° C.

Air exit temp.: 62° C.

The results were dust-free granules having very good free-flow properties, an average particle size (ex mass distribution) of approximately 120 μm, and the following composition:

| | |
|---|---|
| 60.4% | Pigment C.I. Pigment Violet 23 |
| 5.6% | Compound of formula (X) |
| 23.4% | Castor oil oxalkytation product |
| 9.7% | Polyvinyl alcohol |
| 0.9% | Residual moisture (water) |

The resulting pigment preparation of the invention exhibited very good compatibility in commercially customary aqueous, solvent-free and partially solvent-containing white emulsion paints. It was easy to stir into the white paints, by hand for example, and gave strongly coloured, flocculation-stable and speck-free coatings whose colour development could not be substantially improved even by subsequent stirring for 2 minutes using a high-speed stirrer. Pigmentations with more than 10 parts of the preparation in 100 parts of the white paints were possible.

By comparison, a commercially customary liquid preparation of the same colour pigment (Example 16 from DE-A 195 11 624, pigment content 25%) was prepared by the process as described above. Drawdown evaluation was made by introducing 1.5 parts of the preparation of the invention against 3.6 parts of the comparative preparation in 100 parts (in each case) of a commercially customary white paint by manual stirring (2 minutes) and drawdown onto a white test card using a 100 μm coater. Colorimetry by means of the Cielab system gave the following results:

| | Comparative Liquid | Preparation Granules |
|---|---|---|
| Colour strength (%) | 100 | 106 |
| Residual colour difference dE | — | 0.54 |
| Chroma dC | — | 0.48 |

Similarly, even after storage at 50° C. for 4 weeks in comparison to storage at room temperature, the preparation showed only a small drop in colour strength in the drawdown test method, of less than 5%.

The pigment preparation was also easy to incorporate into the commercially customary coating systems specified in Example 1 and exhibited good compatibility therein.

EXAMPLE 3

Red Pigment Preparation Based on C.I. Pigment Red 101

In a dissolver,

| | |
|---|---|
| 20.0 parts | of deionized water were introduced and |
| 0.2 part | of an anionic polyhydroxy compound (xanthan gum, ADM (GB)) was fully dissolved cold; subsequently, |
| 1.54 parts | of an oxalkylation product based on hydrogenated castor oil with 40 mol units of ethylene oxide, |

-continued

| | |
|---|---|
| 1.25 parts | of a 20% strength solution of a reaction product of tetramethyl phosphonosuccinate with polyethylene glycol of molar weight 400 and lauryl alcohol ("phosphonic ester") as per component b2) (prepared as described in example 4, EP 0012351), and |
| 20.0 parts | of the inorganic colour pigment C.I. Pigment Red 101 (Bayferrox ® 130M, Bayer AG) were introduced, the pH was adjusted to 8.4 by means of dilute sodium hydroxide solution, and the suspension was dispersed in the dissolver at a speed of 3000 $min^{-1}$ for 30 minutes. |

Following adjustment with water to a solids content of 40%, drying took place on a single-fluid spray dryer with the following settings:

Nozzle: Swirl chamber nozzle with 1.09 mm bore

Nozzle pressure: 33 bar

Nozzle throughput: 105 kg/h

Air entry temperature: 180° C.

Air exit temperature: 80° C.

This gave dust-free granules having very good free-flow properties, an average particle size (ex mass distribution) of approximately 180 μm, and the following composition:

| | |
|---|---|
| 88.7% | Pigment C.I. Pigment Red 101 |
| 1.1% | Phosphonic ester |
| 6.8% | Castor oil oxalkylation product |
| 0.9% | Anionic polyhydroxy compound |
| 2.5% | Residual moisture (wet) |

The resulting pigment preparation of the invention exhibited very good compatibility in commercially customary aqueous, solvent-free and partially solvent-containing white emulsion paints.

For comparison, a commercial liquid preparation of the same colour pigment (LEVANOX® Rot 130-LF, Bayer AG, pigment content 65%) was used. Colouristic evaluation was made by stirring 1.5 parts of the preparation of the invention or 2.05 parts of the comparative preparation into 100 parts (in each case) of a commercial white paint (Blanc Pour Degrade®, Richard Colorant (F)) by hand and then homogenizing for 10 minutes using a high-speed stirrer. The drawdown comparison was made on a white test card using a 100 μm coater. Colorimetry by means of the Cielab system gave the following results:

| | Comparative Liquid | Preparation Granules |
|---|---|---|
| Colour strength (%) | 100 | 98.6 |
| Residual colour difference dE | — | 0.35 |

Likewise, following storage at 50° C. for 4 weeks, in comparison to storage at room temperature, the preparation showed only a small drop in colour strength in the drawdown test method, of less than 2%.

Examples 4–6

Using the process described in Example 1, further advantageous pigment preparations were prepared with the following compositions:

EXAMPLE 4

| | |
|---|---|
| 68.6% | Pigment C.I. Pigment Red 112 |
| 12.7% | Compound of formula (X) prepared by condensing 2 mol of styrene with 1 mol of phenol, followed by reaction with 13.4 mol of ethylene oxide, |
| 2.0% | Polyvinyl alcohol |
| 15.6% | Compound of the formula (II) |
| 1.1% | Residual moisture (water) |

EXAMPLE 5

| | |
|---|---|
| 74% | Pigment C.I. Pigment Green 7 |
| 5.6% | Compound of formula (X) as in Example 4 |
| 9.5% | Polyvinyl alcohol |
| 9.4% | Compound of the formula (II) |
| 1.5% | Residual moisture (water) |

EXAMPLE 6

| | |
|---|---|
| 72.5% | Pigment C.I. Pigment Blue 15:3 |
| 6.2% | Compound of formula (X) as in Example 4 |
| 9.9% | Polyvinyl alcohol |
| 10.1% | Compound of the formula (II) |
| 1.3% | Residual moisture (water) |

EXAMPLE 7

Yellow Pigment Preparation Based on Pigment Yellow 155

In a high-speed stirrer,

| | |
|---|---|
| 437.0 parts | of deionized water are introduced and |
| 150.0 parts | of a condensation product as comp. b1) in the form of its 29.2% strength aqueous solution, prepared as described in Example 5 of DE-A-19 801 759, |
| 16.0 parts | of an oxalkylation product of formula (XI), prepared as described in Example 10 of DE-A-19 801 759, |
| 700.0 parts | of an anionic polyhydroxy compound (xanthan gum, ADM (GB)) in the form of its 1% strength aqueous solution, and |
| 700.0 parts | of the organic yellow pigment C.I. Pigment Yellow 155 were introduced, the pH was adjusted to 7.1 by means of dilute sodium hydroxide solution and the suspension was beaten homogeneously. |

The composition was subsequently subjected to bead milling with cooling on a horizontal, closed stirred bead mill with a disc stirrer unit, using glass beads (0.47–0.63 mm diameter), grinding charge 70% by volume, milling chamber volume 2 liters, throughput 6.5 kg/h in 2 passes.

This gave a pigment suspension with a high level of fine division, no longer containing any particles over 1 $\mu$m.

The suspension was adjusted with further water to a dry-matter content of 25% and was subsequently dried on a single-fluid spray dryer with the following settings:

Nozzle: swirl chamber nozzle with 1.09 mm bore
Nozzle pressure: 29 bar
Nozzle throughput: 89 kg/h
Air entry temp.: 160° C.
Air exit temp.: 72° C.

The results were dust-free granules having very good free-flow properties, an average particle size (ex mass distribution) of approximately 200 $\mu$m, and the following composition:

| | |
|---|---|
| 90.5% | Pigment C.I. Pigment Yellow 155 |
| 5.7% | Condensation product (comp. b1) |
| 0.9% | Oxalkylation product of formula (X) (comp. b) |
| 2.1% | Anionic polyhydroxy compound (comp. c) |
| 0.8% | Residual moisture (water) |

The resulting pigment preparation of the invention exhibited very good compatibility in commercially customary aqueous, solvent-free and partially solvent-containing white emulsion paints. It was easy to stir into the white paints, by hand for example, and gave strongly coloured, flocculation-stable and speck-free coatings whose colour development could not be substantially improved even by subsequent stirring for 2 minutes using a high-speed stirrer. Pigmentations with more than 10 parts of the preparation in 100 parts of the white paints were possible.

Even after storage at 50° C. for 4 weeks there was no drop in colour strength found.

The preparation showed outstanding properties in particular when used for the pulp colouring of paper, and in the test analogous to the use examples 30–38 from DE-A 19 801 759 gave very strongly coloured and brilliant paper colourings. At equal inputs in respect of the crude pigment content, in comparison to the liquid pigment preparation prepared in accordance with Example 17 of DE-A 19 801 759, equal colour strength and colouristic properties of the papers and of the pressings produced therefrom with melamine-formaldehyde resin were obtained.

Owing to the high pigment content of the pigment preparations of the invention, it was possible to achieve even quantitatively higher and more intensely coloured colourations in comparison to the liquid preparation (Example 17 from DE-A 19 801 759), without disadvantages with regard to foaming during papermaking.

EXAMPLE 8

Red Pigment Preparation Based on C.I. Pigment Red 101

In a dissolver,

| | |
|---|---|
| 9.23 parts | of deionized water were introduced and |
| 0.1 part | of an anionic polyhydroxy compound (xanthan gum, ADM (GB)) was fully dissolved cold; subsequently, |
| 0.25 part | of the reaction product of tetramethyl phosphonosuccinate with polyethylene glycol of molar weight 400 and lauryl alcohol ("phosphonic ester") as per component b3) (prepared as described in Example 4, EP 0012351), and |
| 20.0 parts | of the inorganic colour pigment C.I. Pigment Red 101 (Bayferrox ® 130M, Bayer AG) were introduced, the pH was adjusted to 8.5 by means of dilute sodium hydroxide solution, and the suspension was dispersed in the dissolver at a speed of 3000 min$^{-1}$ for 30 minutes. |

Following adjustment with water to a solids content of 45%, drying took place on a single-fluid spray dryer with the following settings:

Nozzle: Swirl chamber nozzle with 1.09 mm bore
Nozzle pressure: 38 bar
Nozzle throughput: 95 kg/h Air entry temperature: 180° C.

Air exit temperature: 80° C.

The results were dust-free granules having very good free-flow properties, an average particle size (ex mass distribution) of approximately 170 μm, and the following composition:

| | |
|---|---|
| 98.0% | Pigment C.I. Pigment Red 101 |
| 1.2% | Phosphonic ester (comp. b3) |
| 0.5% | anionic polyhydroxy compound (comp. c) |
| 0.3% | Residual moisture (water) |

The resulting pigment preparation of the invention exhibited very good compatibility in commercially customary aqueous, solvent-free and partially solvent-containing white emulsion paints. In particular, it was also very highly compatible in commercially customary silicate binder paints (strongly alkaline).

For comparison, a commercial liquid preparation of the same colour pigment (LEVANOX® Rot 130-LF, Bayer AG, pigment content 65%) was used. Colouristic evaluation was made by stirring 1.5 parts of the preparation of the invention or 2.26 parts of the comparative preparation into 100 parts (in each case) of a commercial white paint (Blanc Pour Degrade®, Richard Colorant (F)) by hand and then homogenizing for 10 minutes using a high-speed stirrer. The drawdown comparison was made on a white test card using a 100 μm coater. Colorimetry by means of the Cielab system gave the following results:

| | Comparative Liquid | Preparation Granules |
|---|---|---|
| Colour strength (%) | 100 | 100 |
| Residual colour difference dE | — | 0.25 |

Likewise, following storage at 50° C. for 4 weeks, in comparison to storage at room temperature, the preparation showed no drop in colour strength.

What is claimed is:

1. A solid pigment composition comprising:

a) at least one pigment, b) at least one compound selected from the group consisting of phenol-styrene-polyglycol ethers and ionically modified phenol-styrene-polyglycol ethers, said at least one compound having an HLB of from 10 to 20 and c) at least one organic thickener.

2. The solid pigment composition of claim 1, wherein component b) possesses an HLB of from 12 to 18.

3. The solid pigment composition of claim 1, wherein component c) comprises a compound selected from the group consisting of dextrins or cyclodextrins, starch and starch derivatives, anionic polyhydroxy compounds, cellulose derivatives, partially hydrolyzed polymers of vinyl acetate, and polymers of N-vinylpyrrolidone, or copolymers of N-vinylpyrrolidone with vinyl esters.

4. The solid pigment composition of claim 1 comprising 20–98% by weight of component a), 0.1–100% by weight of component b), based on pigment of component a), 0.1–4 mg/m² of component c), based on the specific surface area of the pigment of component a), and 0–15% by weight of water, based on pigment of component a).

5. The solid pigment composition of claim 1 comprising 30–95% by weight of component a), 0.5–60% by weight of component b), based on pigment of component a), 0.1–2 mg/m² of component c), based on the specific surface area of the pigment of component a), and 0.2–5% by weight of water, based on pigment of component a).

6. A process for preparing the pigment composition of claim 1 comprising introducing the pigment of component a) as a finished or unfinished powder or water-moist presscake into water or aqueous-organic medium, converting the pigment into a finely divided pigment by a continuous or discontinuous wet comminution technique, adding components b) and c), optionally adjusting the pigment content by adding water, optionally adding additives, and drying the resulting pigment suspension.

7. The process of claim 6, wherein the wet comminution technique comprises homogenization by one of a stirrer, a dissolver, or high-pressure, or comprises grinding on a stirred bead mill.

8. The process of claim 6, wherein drying comprises at least one member selected from the group consisting of spray drying, granulation, mixer, plate or drum granulation, fluid-bed drying and freeze drying.

9. The process of claim 6, wherein drying comprises at least one member selected from the group consisting of single-fluid spray drying using high-pressure and/or swirl-chamber nozzles, and fluidized-bed spray drying.

10. A solid pigment composition comprising;

a) at least one pigment, b) a phenol-styrene-polyglycol ether of the formula (X)

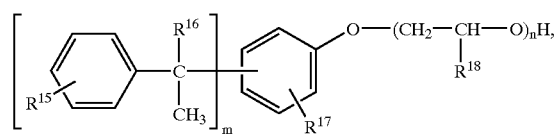

wherein $R^{15}$ represents hydrogen or $C_1$–$C_4$-alkyl, $R^{16}$ represents hydrogen or $CH_3$, $R^{17}$ represents hydrogen, $C_1$–$C_4$-alkyl, $C_1$–$C_4$-alkoxy, $C_1$–$C_4$-alkoxycarbonyl or phenyl, m represents a number from 1 to 4, n represents a number from 6 to 120, $R^{18}$ is identical or different for each unit indicated by n and represents hydrogen, $CH_3$ or phenyl, provided that where $R^{18}$ represents $CH_3$, up to 60% of the total value of n is $CH_3$ and the remainder is hydrogen and where $R^{18}$ represents phenyl, up to 40% of the total value of n is phenyl and the remainder is hydrogen, and/or an ionically modified alkoxylation product of the formula (XI)

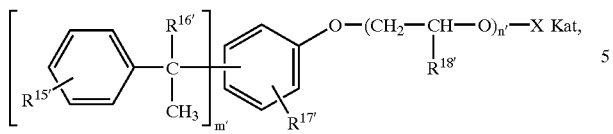

wherein
R$^{15'}$, R$^{16'}$, R$^{17'}$, R$^{18'}$, m' and n' correspond to R$^{15}$, R$^{16}$, R$^{17}$, R$^{18}$, m and n, respectively, but independently thereof, X represents the group —SO$_3^\ominus$, —SO$_2^\ominus$, —PO$_3^{\ominus\ominus}$ or —CO—(R$^{19}$)—COO$^\ominus$, Kat represents a cation selected from the group consisting of H$^\ominus$, Li$^\ominus$, Na$^\ominus$, K$^\ominus$, NH$_4^\ominus$ and —HO—CH$_2$CH$_2$—NH$_4^\ominus$, and where X=—PO$_3^{\ominus\ominus}$ Kat is present twice, and R$^{19}$ represents a divalent aliphatic or aromatic radical, and c) at least one organic thickener.

11. The solid pigment composition of claim 10, wherein R$^{19}$ represents a member selected from the group consisting of C$_1$–C$_4$-alkylene, monounsaturated C$_2$–C$_4$ radicals and optionally substituted phenylene, wherein the substituents are C$_1$–C$_4$-alkyl, C$_1$–C$_4$-alkoxy, C$_1$–C$_4$-alkoxycarbonyl or phenyl.

12. The solid pigment composition of claim 10 wherein R$^{19}$ represents ethylene, acetylene, or ortho-phenylene.

13. The solid pigment composition of claim 10 wherein R$^{19}$ represents substituted ethylene, substituted acetylene or substituted ortho-phenylene, and the substituents are C$_1$–C$_4$-alkyl, C$_1$–C$_4$-alkoxy, C$_1$–C$_4$-alkoxycarbonyl or phenyl.

14. A solid pigment composition comprising
a) at least one pigment,
b) at least one compound selected from the group consisting of
b0) phenol-styrene-polyglycol ethers and ionically modified phenol-styrene-polyglycol ethers,
b1) condensation products prepared from
b1A) sulphonated aromatics
b1B) aldehydes and/or ketones and
b1C) optionally one or more compounds selected from the group consisting of unsulphonated aromatics, urea and urea derivatives, and
b2) phosphoric acid, phosphonic acid and derivatives thereof, and
c) at least one organic thickener,
wherein said solid pigment composition has an average particle size of from 20 to 5000 μm.

15. A solid pigment composition comprising
a) at least one pigment,
b) at least one compound selected from the group consisting of
b0) phenol-styrene-polyglycol ethers and ionically modified phenol-styrene-polyglycol ethers,
b1) condensation products prepared from
b1A) sulphonated aromatics
b1B) aldehydes and/or ketones and
b1C) optionally one or more compounds selected from the group consisting of unsulphonated aromatics, urea and urea derivatives, and
b2) phosphoric acid, phosphonic acid and derivatives thereof, and
c) at least one organic thickener, wherein the solid pigment composition has an average particle size of from 100 to 2000 μm.

16. A solid pigment composition comprising
a) at least one pigment,
b) at least one compound selected from the group consisting of
b0) phenol-styrene-polyglycol ethers and tonically modified phenol-styrene-polyglyool ethers,
b1) condensation products prepared from
b1A) sulphonated aromatics
b1B) aldehydes and/or ketones and
b1C) optionally one or more compounds selected from the group consisting of unsulphonated aromatics. urea and urea derivatives, and
b2) phosphoric acid, phosphonic acid and derivatives thereof, and
c) at least one organic thickener comprising a compound whose 4% strength aqueous solution has a viscosity of ≧2 mPa·s at 20° C.

17. A solid pigment composition comprising
a) at least one pigment,
b) at least one compound selected from the group consisting of
b0) phenol-styrene-polyglycol ethers and tonically modified phenol-styrene-polyglycol ethers,
b1) condensation products prepared from
b1A) sulphonated aromatics
b1B) aldehydes and/or ketones and
b1C) optionally one or more compounds selected from the group consisting of unsulphonated aromatics, urea and urea derivatives, and
b2) phosphoric acid, phosphonic acid and derivatives thereof, and
c) at least one organic thickener, comprising a compound selected from the group consisting of degraded or partially degraded starch, xanthan and carboxymethylcellulose, methylcellulose, hydroxymethyl-, hydroxyethyl- and hydroxypropylcellulose, polyvinyl alcohols, which are hydrolyzed to the extent of more than 70%, and/or vinyl alcohol copolymers, copolymers of vinyl acetate and alkyl vinyl esters, which are partially or fully saponified, and polyvinyl alcohol.

18. A solid pigment composition comprising
a) at least one pigment,
b) at least one compound selected from the group consisting of compounds of the formulae III to V

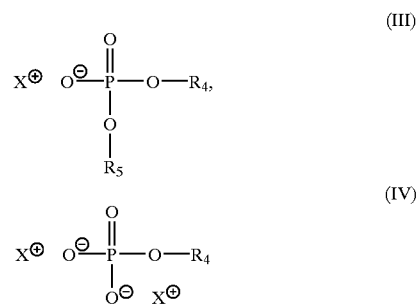

wherein
R$_4$ and R$_5$ independently represent an organic radical having 1–20 carbon atoms and $X^\oplus$ represents H or a monovalent cation,

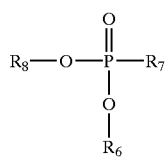
(V)

wherein $R_6$ represents H, or an organic radical having 1–20 carbon atoms, $R_7$ represents $C_{11}$–$C_{22}$-alkyl or cycloalkyl, $C_7$–$C_{18}$-aralkyl, or a radical of the formula —$R_9$—O—CO—$R_{10}$ or —$R_9$—COO—$R_{10}$, $R_8$ represents H or $CH_3$.

$R_9$ represents a substituted or unsubstituted $C_2$–$C_4$-alkylene radical, and $R_{10}$ represents a $C_6$–$C_{22}$-alkyl, cycloalkyl or alkylene radical and c) at least one organic thickener.

19. The solid pigment composition of claim 16, wherein $R_7$ represents a radical of $C_4$–$C_7$ dicarboxylic or tricarboxylic acid or a derivative thereof.

20. The solid pigment composition of claim 18, wherein $R_7$ represents butane-1,2,4-tricarboxylic acid, ethanedicarboxylic acid or a derivative thereof.

21. In a process of pigmenting at least one of natural and synthetic materials, the improvement comprising adding to said natural or synthetic material a solid pigment composition comprising a) at least one pigment, b) at least one compound selected from the group consisting of
 b0) phenol-styrene-polyglycol ethers and ionically modified phenol-styrene-polyglycol ethers,
 b1) condensation products prepared from
  b1A) sulphonated aromatics
  b1B) aldehydes and/or ketones and
  b1C) optionally one or more compounds selected from the group consisting of unsulphonated aromatics, urea and urea derivatives, and
 b2) phosphoric acid, phosphonic acid and derivatives thereof, and c) at least one organic thickener.

22. The process of claim 21, wherein said natural or synthetic comprises a member selected from the group consisting of an aqueous or water-based coating composition, a cement-based building material, an aqueous architectural preservative, a sealing compound, a colored paper coating slip, a paper in the pulp, a nonwoven, a film and a fiber.

23. The process of claim 21, wherein the material comprises an aqueous dispersion plaster.

* * * * *